(12) United States Patent
Pecen et al.

(10) Patent No.: US 6,493,559 B1
(45) Date of Patent: Dec. 10, 2002

(54) METHOD FOR RECEIVING SMSCB MESSAGES DURING GPRS/EDGE DATA TRANSFER MODE

(75) Inventors: Mark E. Pecen, Rolling Meadows, IL (US); Niels Peter Skov Andersen, Roskilde (DK)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/479,758

(22) Filed: Jan. 7, 2000

(51) Int. Cl.$^7$ ................................................. H04Q 7/20
(52) U.S. Cl. ....................................... 455/466; 370/474
(58) Field of Search ................................ 455/466, 422, 455/445, 450; 370/338, 474, 473

(56) References Cited

U.S. PATENT DOCUMENTS

| | | | | |
|---|---|---|---|---|
| 5,050,166 A | * | 9/1991 | Cantoni et al. | 370/94.1 |
| 5,878,033 A | * | 3/1999 | Mouly | 370/312 |
| 6,097,961 A | * | 8/2000 | Alanara et al. | 455/466 |
| 6,212,203 B1 | * | 4/2001 | Anderson et al. | 370/473 |
| 6,263,212 B1 | * | 7/2001 | Ross et al. | 455/466 |

* cited by examiner

Primary Examiner—Daniel Hunter
Assistant Examiner—Tuan Tran
(74) Attorney, Agent, or Firm—Michael C. Soldner

(57) ABSTRACT

An unacknowledged, reliable short message service cell broadcast message reception protocol method to enable short message service cell broadcast messages to be constructed from the fragments of the multiple repetitions of the cell broadcast service messages which are repeated on the cell broadcast channel. When a new message block, corresponding to a recognized type of cell broadcast service message, is geographically coherent with existing partially received data or contains message components previously received, and is temporally coherent with previously received message blocks, the new message block is inserted within a received message structure. If the received message structure is complete and correctly received, the complete message is assembled and sent to an upper software layer.

12 Claims, 4 Drawing Sheets

METHOD FOR RECEIVING SMSCB MESSAGES DURING GPRS/EDGE DATA TRANSFER MODE

FIELD OF THE INVENTION

The present invention relates generally to communication systems, and in particular, the present invention relates to a method for receiving short message service cell broadcast services in a GSM system.

BACKGROUND OF THE INVENTION

As illustrated in FIG. 1, a wireless communication network 100 preferably includes a mobile switching center 102, a plurality of cell sites 104 each having a base station 105 coupled to a base site controller 106. Mobile communication devices 108 or portable communication devices 110 (collectively "mobile stations") are adapt to communicate with base stations associated with the base site controllers 106 to maintain communications with another mobile unit or wireline unit associated with a land line network.

The Global System for Mobile Communications (GSM) defines a teleservice that supports the concept of the transmission of a short message to all mobile stations 108, 110 within the coverage area of a base station 105. This teleservice is referred to as Short Message Service Cell Broadcast (SMSCB) service, and is identified as "Teleservice 23", and permits the broadcast of unacknowledged messages to all receivers within a specific geographical region, which may comprise one or more cells sites 104, or possibly the entire Public Land Mobile Network (PLMN). Cell Broadcast messages are assigned their own geographical area of coverage by agreement between an information provider and a PLMN operator. The Cell Broadcast messages may originate from any number of Cell Broadcast Entities (CBEs) which are connected to a single Short Message Service Center (SMSC); these are the principle network elements which are involved in implementation of this teleservice. The Cell Broadcast Service (CBS) messages may comprise 82 octets each, which, using a default character set, equates to a maximum of 93 characters in length. Up to 15 of these CBS messages, (referred to as "pages" in this case), may be concatenated onto one another to produce a macro-message. Each of these CBS messages comprises four 23 octet radio blocks, and four blocks are received in order during idle-mode to produce a single, CBS message, using specified addressing and link protocol specifications for the transmission of these messages.

Although this service is intended to be used to send information to users during idle mode, there is a desire for this service to be available during General Packet Radio Service (GPRS) or Enhanced Data for Global Evolution (EDGE) data transfer modes. The problem with providing such cell broadcast services during GPRS/EDGE data transfer mode is that it is not possible to receive all of the four blocks which comprise a CBS message according to current GSM specifications. Accordingly, what is needed is a method for receiving SMSCB messages during GPRS/EDGE data transfer mode without requiring a change to the current GSM specifications.

DETAILED DESCRIPTION OF THE PREFERRED EMBODIMENT

Both the availability of short message service cell broadcast (SMSCB) service and the manner in which a base station and network cooperate in the implementation of the short message service cell broadcast service are specified, the short message service cell broadcast service being specified to be available to mobile stations only during idle mode, for example. It is nevertheless the case that during GPRS and EDGE data transfer mode, there are opportunities to read the cell broadcast channel (CBCH), although it is not possible to read the cell broadcast channel for all four contiguous blocks required to construct a cell broadcast service message at one time, due to conflicts in scheduling.

The present invention is an unacknowledged, reliable short message service cell broadcast message reception protocol method to enable short message service cell broadcast messages to be constructed from the fragments of the multiple repetitions of the cell broadcast service messages which are repeated on the cell broadcast channel, the periodicity of these messages being controlled by a PLMN operator. This is useful when scheduling of other TDMA reception or transmission prohibits the mobile station from receiving a message component, or if a message component is missed due to fading channel conditions. As a result, the present invention enables a mobile device to receive short message service cell broadcast messages during periods of GPRS/EDGE data transfer, thereby enabling a user to receive operator-supplied information services such as news, weather, stock quotes and so on, while engaged in a data transfer session. In addition, the base station location services (LCS) processing entity would also be able to send the mobile station LCS parameters.

Figure 1:
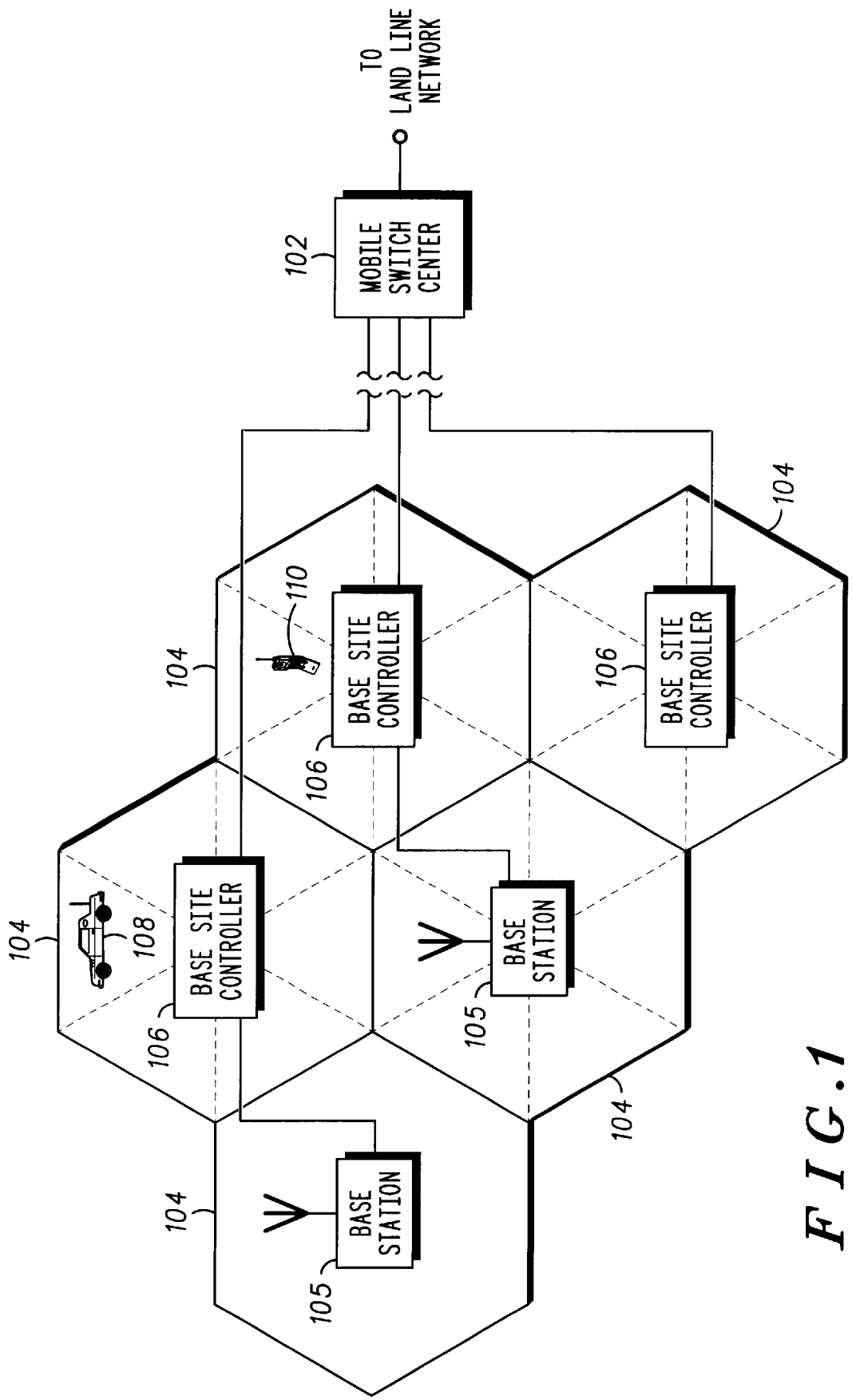
FIG. 1 is a plan view of a wireless communication system transmitting data between a base station and a mobile station.
Figure 2:
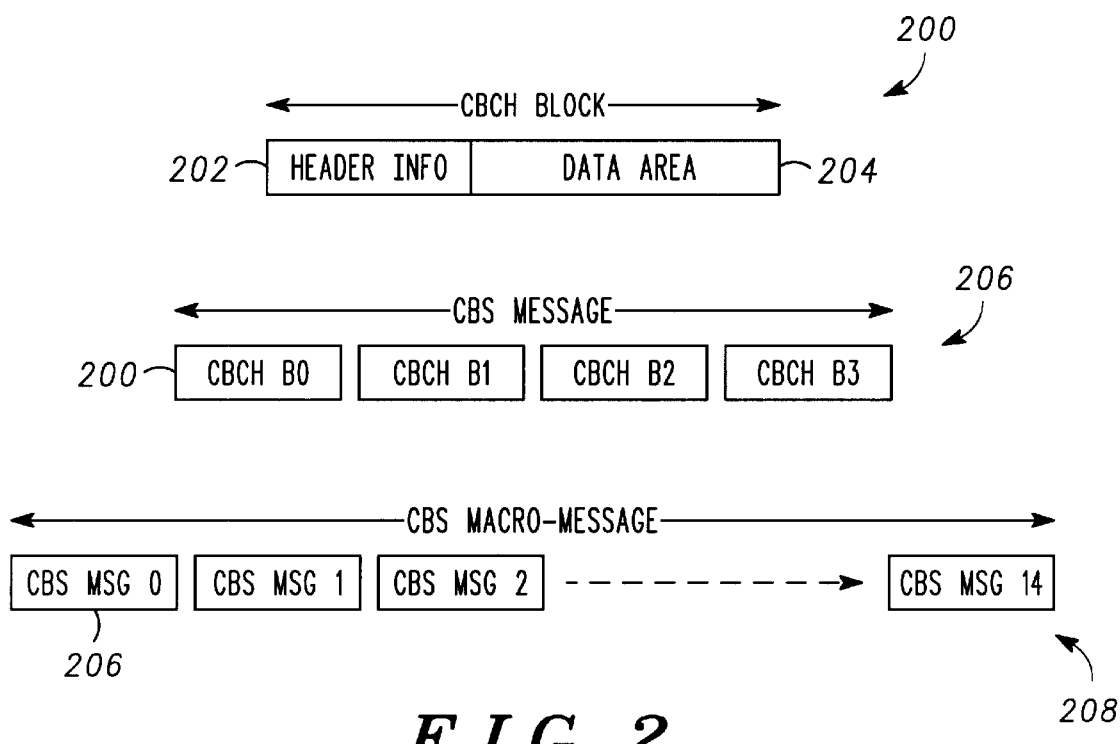
FIG. 2 is a block diagram of a single cell broadcast channel data block of a message component.

As illustrated in FIG. 2, a single cell broadcast channel data block 200 includes a header 202, containing addressing and geographical information, and a data area 204. A cell broadcast service message 206 is produced by combining four of the cell broadcast channel data blocks 200 (CBCH b0–b3), and up to fifteen cell broadcast service messages 206 are combined to produce a single cell broadcast service macro-message 208.

Figure 3:
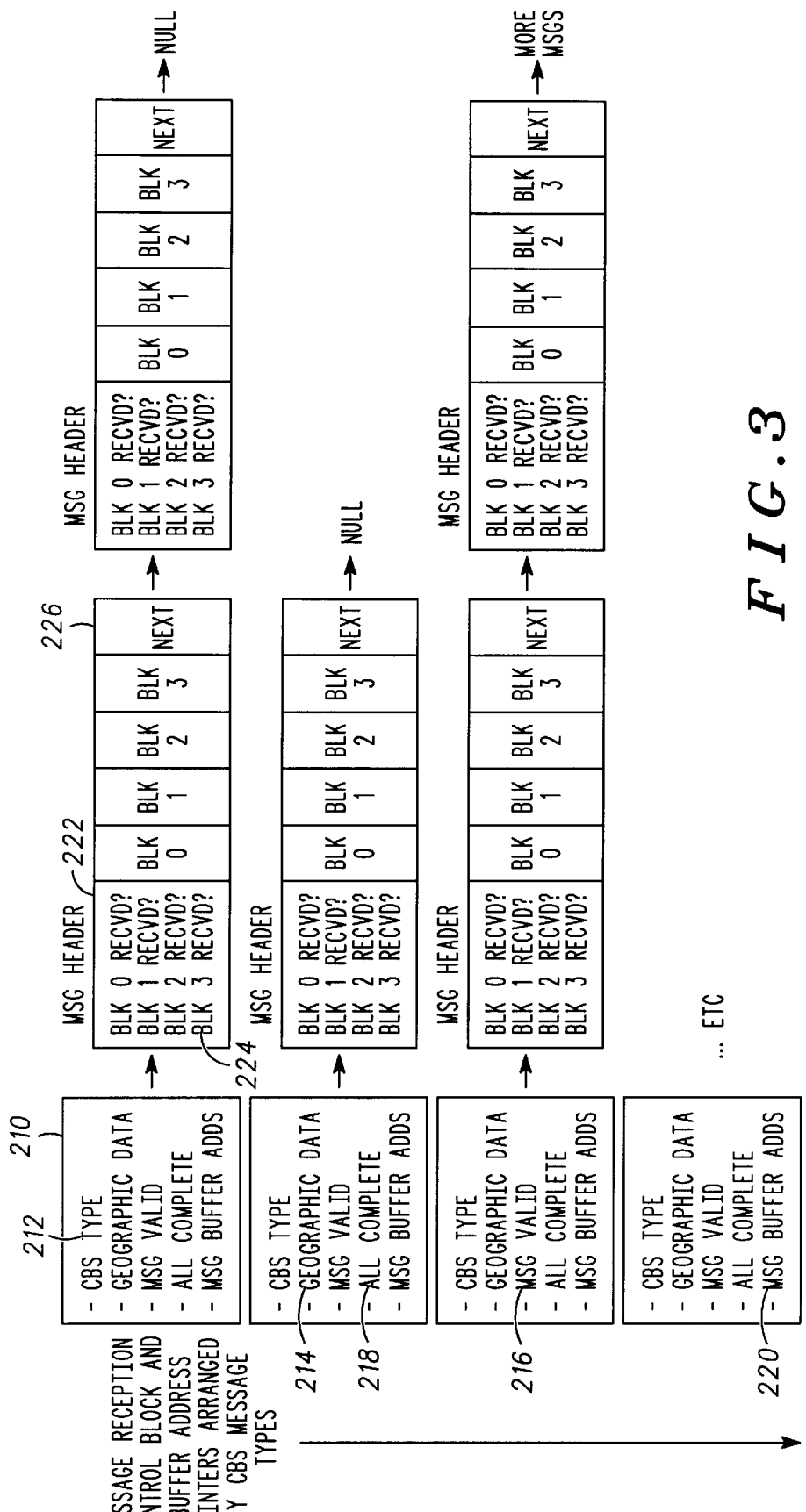
FIG. 3 is a block diagram of a message reception control block and buffer address pointers according to the present invention.

According to the present invention, as illustrated in FIG. 3, this relationship gives rise to an orthogonal arrangement of lists which may be viewed as a set of addresses, each associated with a specific user-selected CBS message type, to accommodate a set of buffers which would contain the entire message. Each message reception control block 210 includes a cell broadcast type component 212 that indicates the type of broadcast message (CBS type) to be recognized by the mobile device, and a geographic data component 214 to indicate whether the mobile device has moved to a different geographical location since last receiving a message fragment. A message valid pointer 216 indicates a function that validates the message in terms of temporal coherency. An all complete pointer 218 indicates a function that tests whether all blocks of all messages and all messages in a macromessage have been completely and correctly received, and a message buffer address pointer 220 indicates the first buffer element of a message header 222. The message header 222 includes counters 224 for indicating whether blocks 0–3 have been previously received, and a next pointer 226 indicating a next message header.

Logic would be implemented to manage the reception of the cell broadcast channel, receiving and processing the contents of the cell broadcast channel at every available opportunity during GPRS/EDGE data transfer mode. When such logic determines that an entire message is received and that all elements in the message are valid, viz. that all blocks, messages and multiple pages are appropriate to the current geo-graphical area, then the complete message or macro-message may be sent up to its consumer software entity.

Figure 4:
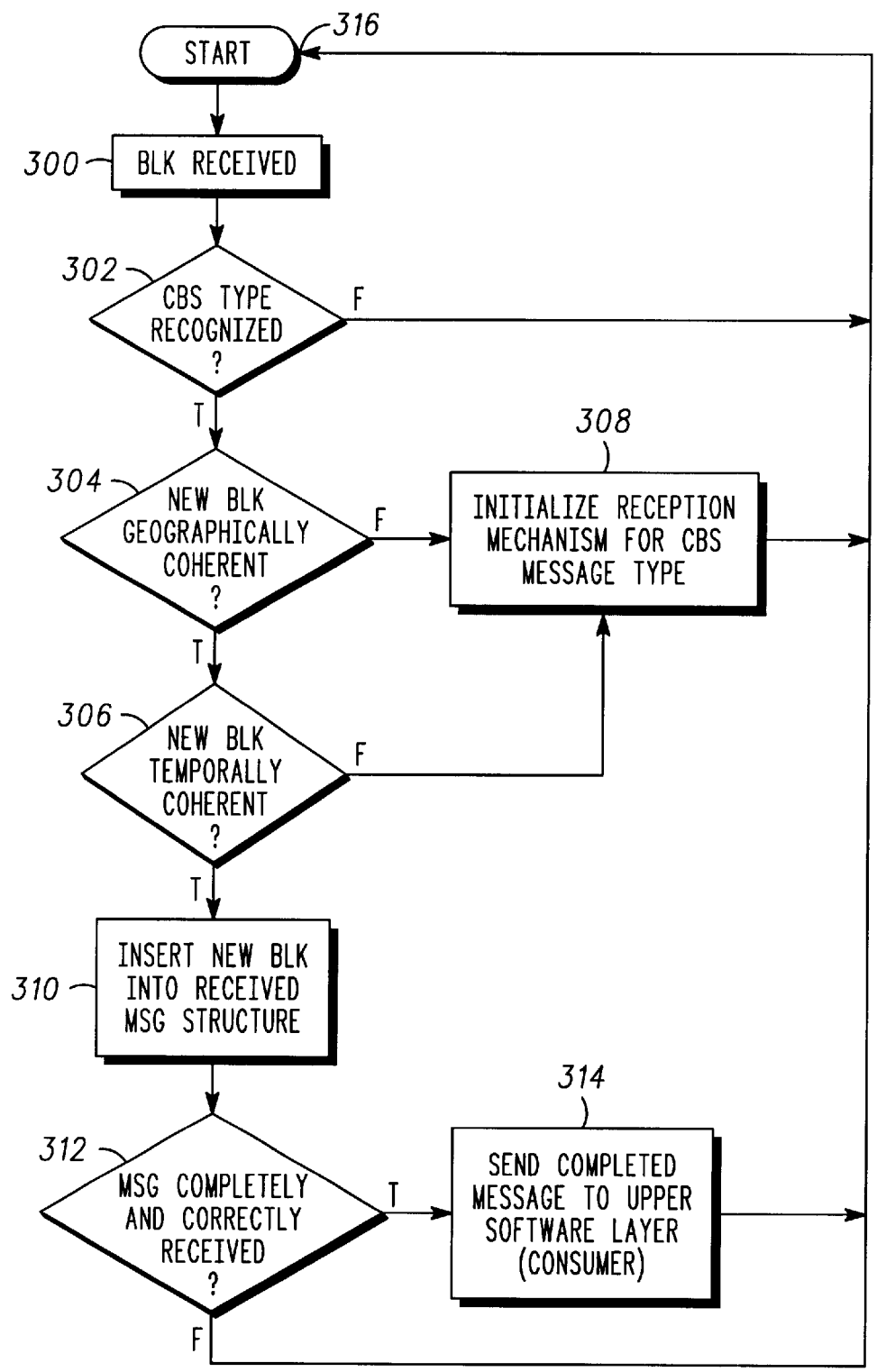
FIG. 4 is a flowchart of a method for receiving short message service cell broadcast message during GPRS/EDGE data transfer mode according to the present invention.

In this way, as illustrated in FIG. 4, in a method for receiving short message service cell broadcast message during GPRS/EDGE data transfer mode according to the present invention, after a message block is received in Step 300, a determination is made in Step 302 as to whether the message block is a recognized cell broadcast service type block. If the block is a recognized cell broadcast service block, a determination is made in Step 304 as to whether the newly received block is geographically coherent with existing partially received data or has message components previously received. In addition, a determination is made in Step 306 as to whether the newly received message block is temporally coherent with existing partially received data corresponding to previously received message blocks. If the block is not geographically or temporally coherent, a reception mechanism for a cell broadcast service message type is initialized in Step 308, by removing all previously received message blocks and initializing the counters to only receive the message blocks of the new message, and the process waits for receipt of the next message block.

If geographically and temporally coherent, the new message block is inserted into the received message structure of FIG. 3 in Step 310, and an indication is made in the message block header that the new message block was received. If it is determined in Step 312 that the message is completely and correctly received, the completed message is assembled from the received blocks and is sent to an upper software layer in Step 314, which would be a consumer of the message. If it is determined in Step 312 that the message is not completely and correctly received, the process waits for the next new message block (Step 316).

It should be noted that a fair amount of logic is required to handle the geographic aspects of the information being received on cell broadcast channel, since certain information may become invalidated as the mobile station traverses into a different geographical region within the same PLMN, while other information may retain its validity as the mobile moves among the coverage areas of various cells.

Figure 5:
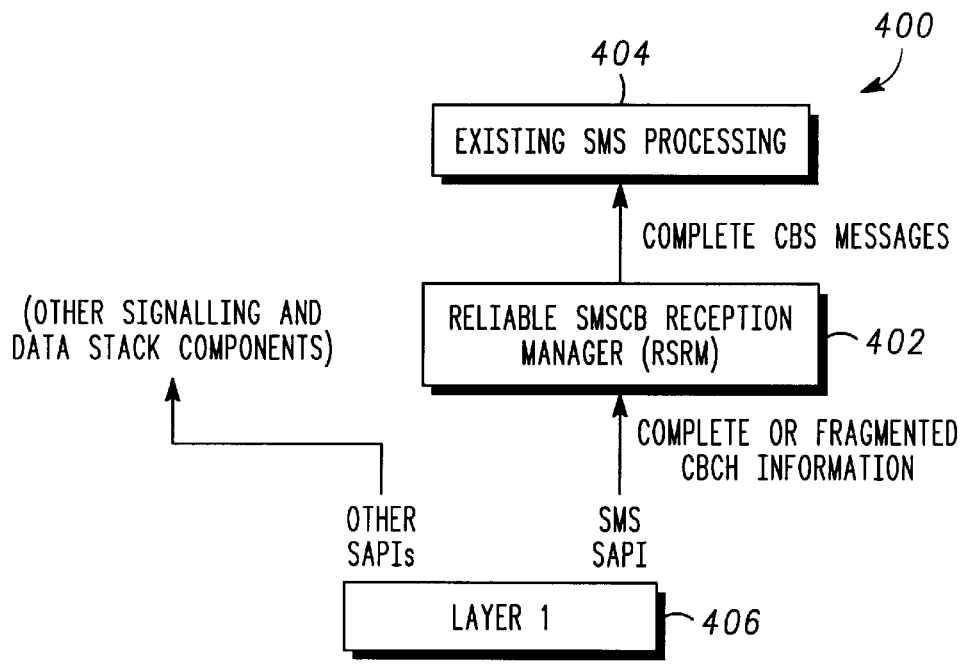
FIG. 5 is a block diagram of a data and signaling stack according to the present invention.

In this way, as illustrated in FIG. 5, in a data and signaling stack 400 according to the present invention, cell broadcast channel data is directed to a reliable SMSCB reception manager (RSRM) 402, which includes either complete or fragmented cell broadcast channel messages. The RSRM 402 outputs only a completely received cell broadcast service message or macro-messages to an existing short message service processing component 404. As illustrated in FIG. 5, a message received by RF hardware and processed by a channel decoder (not shown) is received by a physical layer (Layer 1) interface 406 of the data and signaling stack 400 of the present invention. If the message is other than a short message service message, the physical layer 406 transfers the message to other signaling and data stack components. If the received message is a service access point identifier (SAPI) or short message service data, the message is sent to the RSRM 402, and processed using the method described in FIG. 4. When completed, the message is sent to an existing short message service processor 404, i.e., consumer, as described above.

While a particular embodiment of the present invention has been shown and described, modifications may be made. It is therefore intended in the appended claims to cover all such changes and modifications which fall within the true spirit and scope of the invention.

What is claimed is:

1. A method for receiving GSM short message service cell broadcast data, comprising the steps of:

receiving a new message block;

determining whether the new message block is a recognized type of cell broadcast service message;

determining whether the new message block is geographically coherent with existing partially received data;

determining whether the new message block is temporally coherent with previously received message blocks;

inserting the new message block within a received message structure;

determining whether the received message structure is complete and correctly received; and assembling the complete message from received message blocks and sending the complete message to an upper software layer.

2. The method of claim 1, further comprising the step of initializing a reception mechanism for a cell broadcast services message type and waiting for receipt of a next short message service cell broadcast message block in response to the new short message service cell broadcast message block not being geographically coherent with existing partially received data.

3. The method of claim 2, wherein the initializing step includes removing all previously received message blocks and initializing counters to only receive message blocks of the new short message service cell broadcast message block.

4. The method of claim 1, further comprising the step of initializing a reception mechanism for a cell broadcast services message type and waiting for receipt of a next message block in response to the new short message service cell broadcast message block not being temporarily coherent with previously received message blocks.

5. The method of claim 4, wherein the initializing step includes removing all previously received message blocks and initializing counters to only receive message blocks of the new short message service cell broadcast message block.

6. The method of claim 1, wherein the assembling step further comprises, assembling said complete message comprising at least four cell broadcast channel data blocks.

7. The method of claim 6 wherein the assembling step further comprises, assembling said complete message to form a cell broadcast service macromessage comprising up to 15 cell broadcast service messages.

8. The method of claim 1, wherein the receiving step further comprises, sending said complete message to a user interface layer.

9. The method of claim 1, wherein the receiving step further comprises, receiving a new short message service cell broadcast message block comprising at least geographical information in a header of said short message service cell broadcast message block.

10. The method of claim 9 wherein the method further comprises, receiving a new short message service cell broadcast message block further comprising addressing information in said header of said short message service cell broadcast message block.

11. A data and signaling stack of a wireless communication network, comprising:

a reception manager receiving cell broadcast channel data and outputting only completely received short message service cell broadcast messages, wherein, in response to receiving the cell broadcast channel data, the reception manager inserts the cell broadcast channel data within a received message structure when the cell broadcast channel data is a recognized type of short message service cell broadcast message and is geographically and temporally coherent, determines whether the received message structure is complete and correctly received, and if complete, assembles the complete message from received message blocks and sends the complete message to an upper software layer; and a physical layer interface receiving messages and sending short message service cell broadcast messages to the reception manager, wherein the completely received short message service cell broadcast messages output by the reception manager are construed from fragments of multiple repetitions of short message service cell broadcast messages.

12. The data and signaling stack claim 11, wherein the physical layer interface sends received messages that are not short message service cell broadcast messages to other signaling and data stack components.

* * * * *